US009718629B2

(12) United States Patent
Wenninger et al.

(10) Patent No.: US 9,718,629 B2
(45) Date of Patent: Aug. 1, 2017

(54) METHOD AND APPARATUS FOR THE FLUSH TRANSFER OF LARGE-SURFACE-AREA PANELS OF DIFFERENT TYPES OF CONSTRUCTION TO A TRANSPORTING VEHICLE

(71) Applicant: Grenzebach Maschinenbau GmbH, Asbach-Baeumenheim (DE)

(72) Inventors: Egbert Wenninger, Rain (DE); Roland Jenning, Tapfheim (DE); Franz Krommer, Mertingen (DE)

(73) Assignee: Grenzebach Maschinenbau GmbH, Asbach-Baeumenhei (DE)

( * ) Notice: Subject to any disclaimer, the term of this patent is extended or adjusted under 35 U.S.C. 154(b) by 300 days.

(21) Appl. No.: 14/391,949

(22) PCT Filed: Apr. 17, 2013

(86) PCT No.: PCT/DE2013/000200
§ 371 (c)(1),
(2) Date: Oct. 10, 2014

(87) PCT Pub. No.: WO2013/159759
PCT Pub. Date: Oct. 31, 2013

(65) Prior Publication Data
US 2015/0063976 A1    Mar. 5, 2015

(30) Foreign Application Priority Data
Apr. 24, 2012    (DE) .................. 10 2012 008 239

(51) Int. Cl.
*B65F 9/00*    (2006.01)
*B65G 67/04*    (2006.01)
(Continued)

(52) U.S. Cl.
CPC ............ *B65G 67/04* (2013.01); *B25J 11/005* (2013.01); *B60L 9/00* (2013.01); *B65G 49/061* (2013.01);
(Continued)

(58) Field of Classification Search
USPC ......... 414/398, 737, 353, 331.09; 198/468.6, 198/468.1
See application file for complete search history.

(56) References Cited

U.S. PATENT DOCUMENTS 6,659,265 B2 * 12/2003 Pfeilschifter ........ B65G 47/904
198/468.1
7,412,805 B2    8/2008 Parrish
(Continued)

FOREIGN PATENT DOCUMENTS

DE    19712368 A1    10/1998
DE    101 48 038 A1    4/2003
(Continued)

OTHER PUBLICATIONS

Office action in ser. No. DE102012008239.8 dated Dec. 12, 2012.

*Primary Examiner* — Saul Rodriguez
*Assistant Examiner* — Willie Berry, Jr.
(74) *Attorney, Agent, or Firm* — Walter | Haverfield LLP; D. Peter Hochberg; Sean F. Mellino

(57) ABSTRACT

Method and apparatus for the flush transfer of large-surface-area panels of different types of construction to a transporting vehicle, having the following features. At least one conveyor for supplying panels of at least one type of construction. At least one pivoting-stack apparatus, having a gripper frame and having adhesion elements fastened thereon. At least one stack framework on a mobile carriage, wherein the latter is connected to at least one transporting vehicle by a switchable coupling. The transporting vehicle is (Continued)

supplied with power, and controlled electronically and/or electrically, by a multiplicity of lines installed in the floor region. An electrically controlled parking brake on each transporting vehicle, for arresting purposes.

8 Claims, 3 Drawing Sheets

(51) Int. Cl.
| | |
|---|---|
| *B65G 49/06* | (2006.01) |
| *B25J 11/00* | (2006.01) |
| *B60L 9/00* | (2006.01) |
| *B62B 3/10* | (2006.01) |

(52) U.S. Cl.
CPC ......... *B65G 49/062* (2013.01); *B65G 49/064* (2013.01); *B65G 49/067* (2013.01); *B65G 49/068* (2013.01); *B62B 3/108* (2013.01)

(56) References Cited

U.S. PATENT DOCUMENTS

| | | | | |
|---|---|---|---|---|
| 2007/0060027 | A1* | 3/2007 | Kobayashi | B24B 37/102 451/57 |
| 2008/0244454 | A1* | 10/2008 | Shibaike | G06F 3/0482 715/835 |
| 2010/0161266 | A1* | 6/2010 | Meijles | G01N 21/93 702/94 |
| 2013/0211766 | A1* | 8/2013 | Rosenberg | G01B 21/042 702/97 |

FOREIGN PATENT DOCUMENTS

| | | |
|---|---|---|
| DE | 10148038 A1 | 4/2003 |
| DE | 197 12 368 A1 | 8/2006 |
| DE | 601 23 604 T2 | 8/2007 |
| DE | 60123604 T2 | 8/2007 |
| DE | 10 2008 045370 A1 | 4/2010 |
| DE | 102009040951 A1 | 6/2011 |
| DE | 102010006653 A1 | 8/2011 |

* cited by examiner

METHOD AND APPARATUS FOR THE FLUSH TRANSFER OF LARGE-SURFACE-AREA PANELS OF DIFFERENT TYPES OF CONSTRUCTION TO A TRANSPORTING VEHICLE

CROSS-REFERENCE TO RELATED APPLICATIONS

This application is a National Stage application of International Application No. PCT/DE2013/000200, filed on Apr. 17, 2013, which claims priority of German application Serial Number 10 2012 008 239.8, filed on Apr. 24, 2012, both of which are incorporated herein by reference in their entireties.

BACKGROUND OF THE INVENTION

Field of the Invention

The invention relates to the flush transfer of large-surface-area panels of different types of construction, such as, for example, glass panels, wood fiber panels or plasterboard panels, onto a transporting vehicle.

Description of the Prior Art

Such large-surface-area panels are required above all in the construction of conventional single-family homes and apartment blocks in the form of panels for interior work, in the construction of prefabricated houses in the form of the most varied pre-fabricated structural panels or for developing facades in the form of the most varied types of glass panels.

Thus, for example, DE 601 23 604 T2 makes known a prefabricated house which consists of specially developed wall panels, a plurality of safety members and specifically realized roofing panels.

The production of large-surface-area glass panels, in contrast, is effected in the form of float glass as a result of continuously pouring molten glass on a tin bath which is heated in an elongated trough and of the resultant glass ribbon. The subsequent preparation of the float glass occurs as a result of longitudinal cutting and cross cutting of the glass ribbon which emerges from the float glass production at a certain forward feed speed. In this connection, longitudinal cutting wheels which are installed in a stationary manner in the corresponding position above the glass ribbon bring about the longitudinal cutting and the cross cutting is effected by means of cutting bridges and cross cutting wheels which are moved transversely thereto over the glass ribbon.

Glass panels of considerable size can be produced in this way. A size of 6 meters by 3.21 meters is designated in this respect as a so-called ribbon measure or large format. A panel size of 3.21 meters by 2 meters (up to 2.5 meters) is designated as a so-called split ribbon size or medium format.

In order to transport glass panels of such a size from one site to another in a fracture-free manner, holding mechanisms, in the majority of cases in the form of a sturdy frame, are moved toward the relevant glass panel for this purpose, connected thereto by means of suction cups, and then the holding mechanism with the glass panel suctioned thereto is conveyed further.

DE 197 12 368 A1 from the prior art makes known a method for shifting objects from a first position to a second position using a holding mechanism which binds the object to itself during the shifting procedure, where the object to be achieved is to develop said method further in such a manner that objects are able to be securely shifted under all circumstances in a simple manner. In this case, glass panels are named as the objects to be shifted.

The solution of said object, according to the specifications identified in claim 1, is characterized in that the approaching of the lifting mechanism to the object to be shifted to the first or the second position is effected with consideration to the actual position and/or alignment of the same, the holding mechanism being aligned, where required, by utilizing a free rotatability and/or pivotability of the same about one or several axes.

In apparatus claim 7 as further claimed, it is explained in more detail that the object to be shifted is a glass panel, that the first position is an internal loader rack and that the second position is a conveyor belt and the holding mechanism is a suction frame.

DE 101 48 038 A1 describes a device for transferring panels from a panel conveyor to a stacking rack or the like, having a robot with a robot arm which bears on its free end a suction frame or the like for receiving a panel from the panel conveyor, and which is developed with a number of degrees of freedom that is adequate for its movement function.

The object underlying the further development of such a device is to realize a device for transferring the panels from a panel conveyor to a stacking rack such that, in the event of a glass panel, there is as little impairment as possible of the air side of the glass.

Said object is achieved in that the panel conveyor is provided with a recess, into which the robot arm is able to enter, and with recesses which also enable the suction frame or the like to enter. In addition, the suction frame or the like is to be arranged on the free end of the robot arm so as to be pivotable into an upwardly pointing position in order to grip a panel on its side that faces the panel conveyor from the position entering into the recesses of the panel conveyor.

The stacking rack used here is fastened immovably on the floor, consequently it can only be loaded from the side that faces the robot arm. In addition, the stacking rack, each time it is loaded with a further glass panel, has to be moved away from the robot arm by the small distance of the thickness of a glass panel as the distance from the robot arm is a fixed variable. To this end, in practice in the case of the current prior art, so-called carriages are necessary which move the stacking rack away from the robot arm by the distance of a glass panel thickness in each case prior to loading with a new glass panel in order to make space for a further glass panel. In addition, a turntable is necessary for loading the stacking rack from the other side. To load the stacking rack with large and heavy glass panels, the carriages required and the turntable necessary in conformity with the load occurring are constructed in a time-consuming and labor-consuming manner and are very expensive to produce.

SUMMARY OF THE PRESENT INVENTION

Consequently, the object underlying the present invention is to provide a cost-efficient and reliable solution for the two-sided stacking of large-surface-area panels of different types of construction when supplied from a panel conveyor to a stackable conveying means.

In addition, there is the need to organize the further transport of the panels that have been removed from the panel conveyor and the use of said transport system for transporting panels of different types of construction at the same time.

Said object is achieved by the apparatus according to claim 1.

An apparatus for the flush transfer of large-surface-area panels of different types of construction to a transporting vehicle, said apparatus having the following features:

a) at least one conveyor (6) for delivering panels (4) of at least one type of construction, wherein the conveyor (6) has recesses for access to the panels (4) even from the underside, b) at least one pivot-stack apparatus (5) with a gripper frame (7), a rotating and pivoting apparatus (8) and with gripping elements which are fastened on the gripper frame (7), c) at least one stacking rack (3) on a drivable carriage (2), wherein said carriage is connected to at least one transporting vehicle (1) by means of a connectable coupling (20), and wherein the transporting vehicle (1) is supplied with power by means of a plurality of lines (11) which are installed in the floor region and is controlled electronically or electrically, d) an electrically controlled parking brake (17) on each transporting vehicle (1) for locking.

Claim 2:

The apparatus as claimed in claim 1, wherein a pivot-stack apparatus (5) comprises a sensor (14) on each of the two pivot arms (12) for measuring the distance to the stacking rack (3).

Claim 3:

The apparatus as claimed in claim 1, wherein a camera 19 which is installed on the gripper frame 7 records the dimensions and the relevant quality features of the incoming panels (4).

Claim 4:

The apparatus as claimed in claim 1, wherein a panel correcting device (18) serves for the purpose of correcting the alignment on the conveyor (6).

Claim 5:

The apparatus as claimed in claim 1, wherein a stacking rack (3) comprises sensors (16) on both stack sides for determining the number of panels (4) located on each side.

Claim 6:

The apparatus as claimed in claim 1, wherein a stacking rack (3) comprises a display (15) with indication of the relevant parameters of the respective configuration.

or the method as claimed in claim 7:

A method for the flush transfer of large-surface-area panels of different types of construction to a transporting vehicle, said method having the following features:

a) every type of construction of panels (4) used is transported on at least one conveyor (6) into the region of at least one respective pivot-stack apparatus (5), b) each panel (4) is then lifted on the apparatus (5) by means of gripping elements, which are fastened on a gripper frame (7), from the roller conveyor (6) by means of a pivot arm (12) and a rotating and pivoting device (8) for the gripper frame (7) and pivoted into the region of at least one stacking rack (3) on a carriage (2), wherein the carriage (2) is mechanically connected to at least two transporting vehicles (1) by means of in each case one connectable coupling (20), and the transporting vehicles (1) are driven and controlled in an inductive manner by means of induction and control lines (11), c) at the same time the distance between the stacking rack (3) and the apparatus (5) is determined, the stacking rack (3) is adjusted by means of both transporting vehicles (1) and the carriage (2) is mechanically locked, d) the respective panel (4) is then deposited on the relevant stacking rack (3) by means of the pivot arm (12), e) the relevant stacking rack (3), according to the desired loading on the relevant side, is then either rotated and loaded again on the other side or moved to a further destination.

Claim 8:

The method as claimed in claim 7, wherein the dimensions and the relevant quantity features of the incoming panels (4) are measured by means of a camera (19).

Claim 9:

The method as claimed in claim 7, wherein the structure of the induction and control lines (11) is produced by means of induction and installation panels (21).

Claim 10:

A computer program having a program code for carrying out the method steps as claimed in claim 7 when the program is carried out on a computer.

Claim 11: A machine-readable carrier with the program code of a computer program for carrying out the method as claimed in claim 7 when the program is carried out on a computer.

BRIEF DESCRIPTION OF THE DRAWINGS

The apparatus according to the invention is described in more detail below, in which.

DETAILED DESCRIPTION OF THE PRESENT INVENTION

Figure 1:
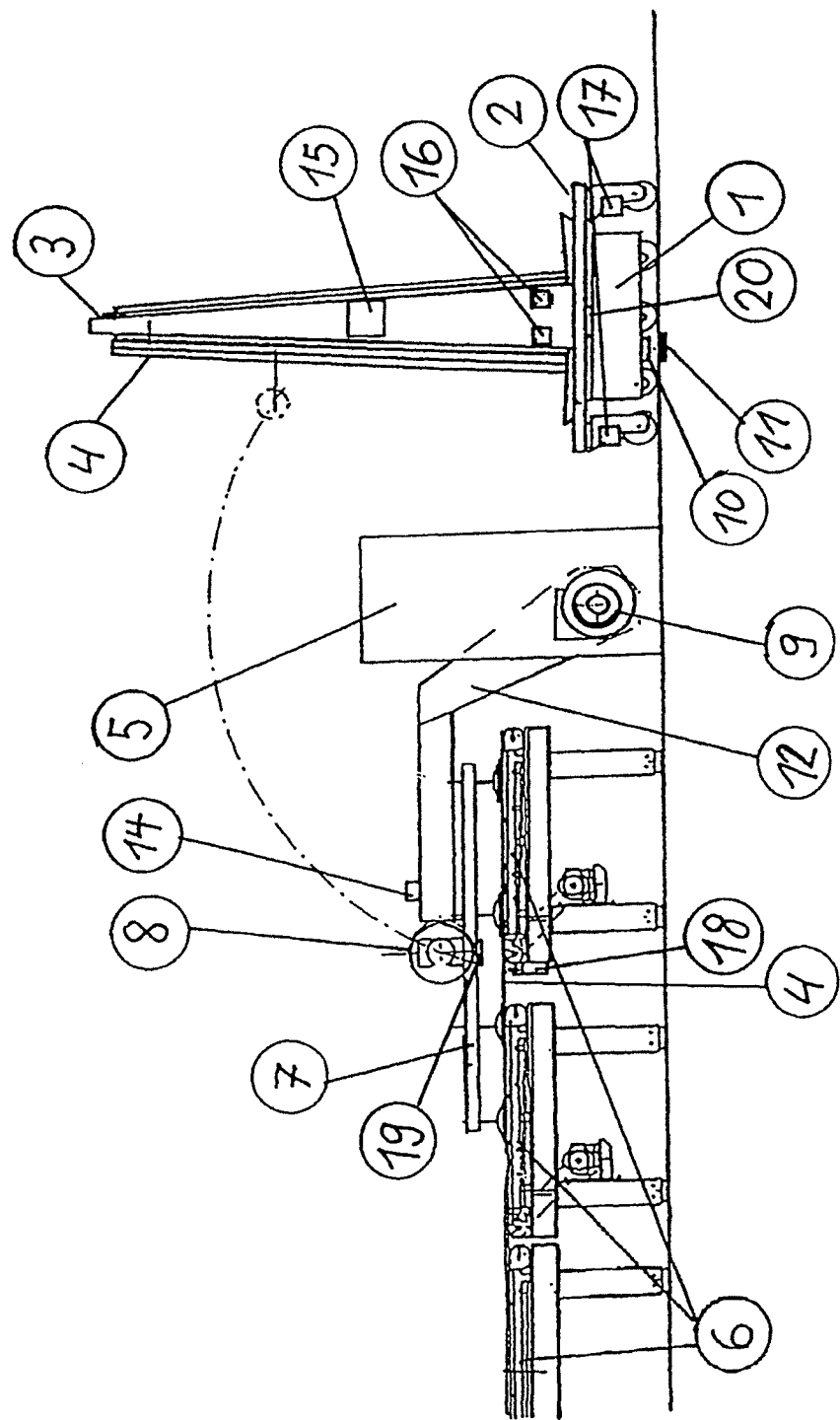
FIG. 1: shows a side view of the apparatus according to the invention.

FIG. 1 shows a side view of the apparatus according to the invention. Three portions of a conveyor, in this case specifically a roller conveyor 6, are shown on the left-hand side followed in the direction of movement by a pivot-stack apparatus 5. Said apparatus 5 comprises a pivot arm 12 with a direct drive 9 which bears a gripper frame 7 which is actuated by means of a rotating and pivoting device 8. The gripper frame 7 is connected to the panel 4 by means of the four suction cups, which are not shown in any more detail in the side view. The capturing of the panel 4 by means of the gripper frame 7 is effected from above in said representation. The recess shown in the region of the conveyor 6 also permits a panel 4 to be captured from below. The use of a gripping robot or a related device is also possible for de-stacking the panels 4 in place of the apparatus 5.

On the end of the pivot arm 12 there is a sensor 14 for ensuring the parallel position of the panels 4. Said device is described in more detail in FIG. 2. The panel camera 19, which is also arranged in said region, records the dimensions of the incoming panels 4 and can additionally give the control center of the present installation possibly required information concerning the quality features thereof.

The panel correcting device 18 which is also arranged here serves the purpose of, prior to capture by the pivot-stack apparatus 5, aligning in a straight manner those panels 4 which have not been aligned parallel to the direction of movement on the conveyor 6. This can occur in the simplest case as a result of the running rollers of the last part of the roller conveyor 6 being disconnected, and the relevant panel 4 to be aligned being braked by said rollers and being automatically aligned by means of the displaced rollers of the conveyor 6. In the other case, the panel correcting device 18 brings about said positional correction as a result of the short-term stroke-controlled lifting of an alignment strip, which is aligned parallel to the running rollers, in conjunction with the displaced rollers of the roller conveyor 6. Said latter method can be applied particularly in the case of non-delicate panels 4.

The transporting vehicle 1, which is shown on the right-hand side in the side view, is connected to the carriage 2 of a stacking rack 3 by means of a coupling 20. Said coupling 20 can be switched on by radio after a transporting vehicle 1 has moved under a carriage 2. The coupling 20 is situated between each carriage 2 or the associated stacking rack 3, and the, in each case, associated transporting vehicle 1. The coupling 20 can not only be switched on and off by radio in each case but also inductively by means of the, in each case, corresponding control line 11. The coordination of said control is a question of the layout of the respective control system and of the corresponding program.

The supply of power for the drive of a transporting vehicle 1 is effected inductively by means of a line 11. The corresponding power transmission device 10 is situated as close as possible to the floor on the underside of the respective transporting vehicle 1. Said lines 11 are laid in the floor in the respective installation corresponding to the desired movement lines of the transporting vehicles 1.

The layout of the structure of said movement lines, that is the detailed visualization of a marked image of the traffic routes to be traveled along, and consequently a subsequent actual cable laying, includes necessary redundant travel paths and parking spaces, as well as corresponding points. More detail in this respect is explained in FIG. 3.

The laying of the required control lines for the operation of the overall installation is effected in conjunction with the lines for the inductive current supply.

The laying of the lines 10 is normally effected during the construction of the floor of the overall installation and the structure realized in this manner can only be altered subsequently with difficulty.

In a particular embodiment it is consequently proposed to lay large-surface-area panels with predefined part structures of power-supplying induction cabling and control lines in the entire region of the installation to be set up, or in part regions, instead of fixedly laid induction cabling. In this connection, said prefabricated panels must have standardized connection elements which enable flexible assembling and frictionless integration of said panels amongst one another and into a structure which is possibly already there (cf. also FIG. 3 to this end).

Three panels 4 are shown on the stacking rack 3 on the left-hand side and on the right-hand side one panel 4. Sensors 16 are installed on each side in the lower region of the stacking rack for detecting the number of panels. In the center of the stacking rack 3 there is a display 15 which indicates the relevant parameters of the configuration of the respective stacking rack. This serves for informing the personnel of the respective installation. The information visible here is naturally also available to the control unit of the overall installation.

The braking device 17, which is provided on the carriage 2 of the stacking rack 3, serves for the purpose of anchoring the stacking rack 3 fixedly on the floor during loading so that the stacking rack 3 is not able to be displaced when panels 4, in particular the heavy panels 4, are placed into position, and the individual panels 4 are able to be placed in position in a flush manner. The braking device 17 is automatically actuated by the central control device of the respective installation, and/or switched in dependence on the position of the pivot-stack apparatus 5.

More than two transporting vehicles 1 can also be used for transporting large and/or heavy panels.

Figure 2:
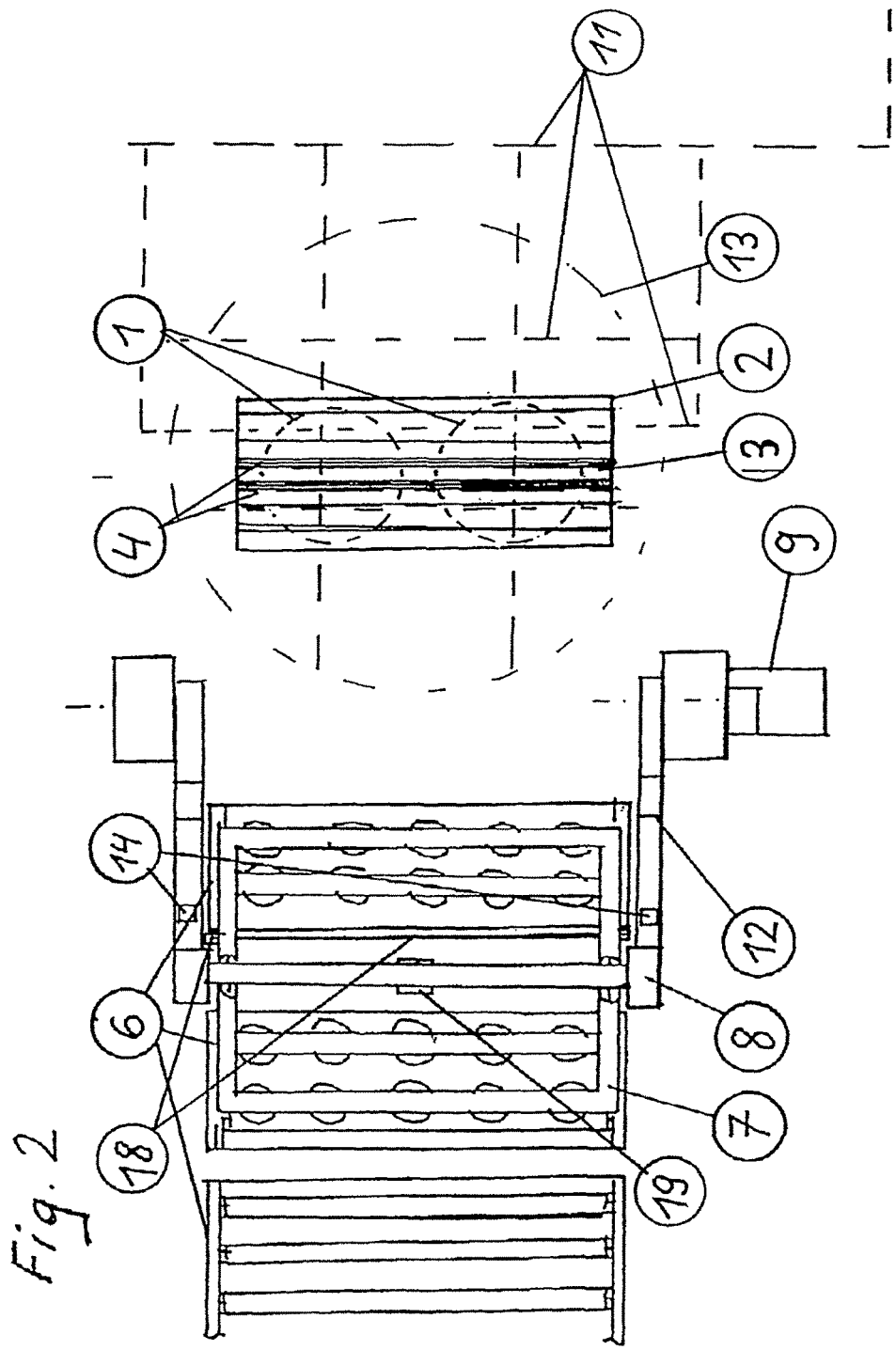
FIG. 2: shows a top view of the apparatus according to the invention.

FIG. 2 shows a top view of the apparatus according to the invention. In this case, the pivot arm 12 can be seen with its direct drive 9 above the three elements of the conveyor 6 from FIG. 1. The rotating and pivoting device 8 which is connected to the pivot arm 12 bears the gripper frame 7 with twenty sketched gripping elements.

A sensor 14 is provided on each of the two sides of the pivot arm 12 to check the parallel position of the panels 4 captured by the pivot-stack apparatus 5 in relation to the contact surface of the stacking rack 3. In the simplest case, said sensors measure the distance between the rotating and pivoting device 8 and the previously deposited panel 4. Possible discrepancies in the parallel position of two panels 4 to be deposited one behind the other can be detected in good time in this way and corrected by means of rotating the stacking rack 3 above the relevant transporting vehicle 1. Such a correction is effected in the simplest case by a slight movement of a transporting vehicle 1 which converts said movement into a rotation of the carriage 2 and consequently of the stacking rack 3. The possibility of a complete rotation as a result of the simultaneous movement of both transporting vehicles 1 shown is characterized by the turntable 13. The principle structure of the induction and control lines 11 for the operation of the transporting vehicles 1 is indicated by the layout of the line 11. Said structure depends on the conditions in the relevant factory building in the respective case.

Figure 3:
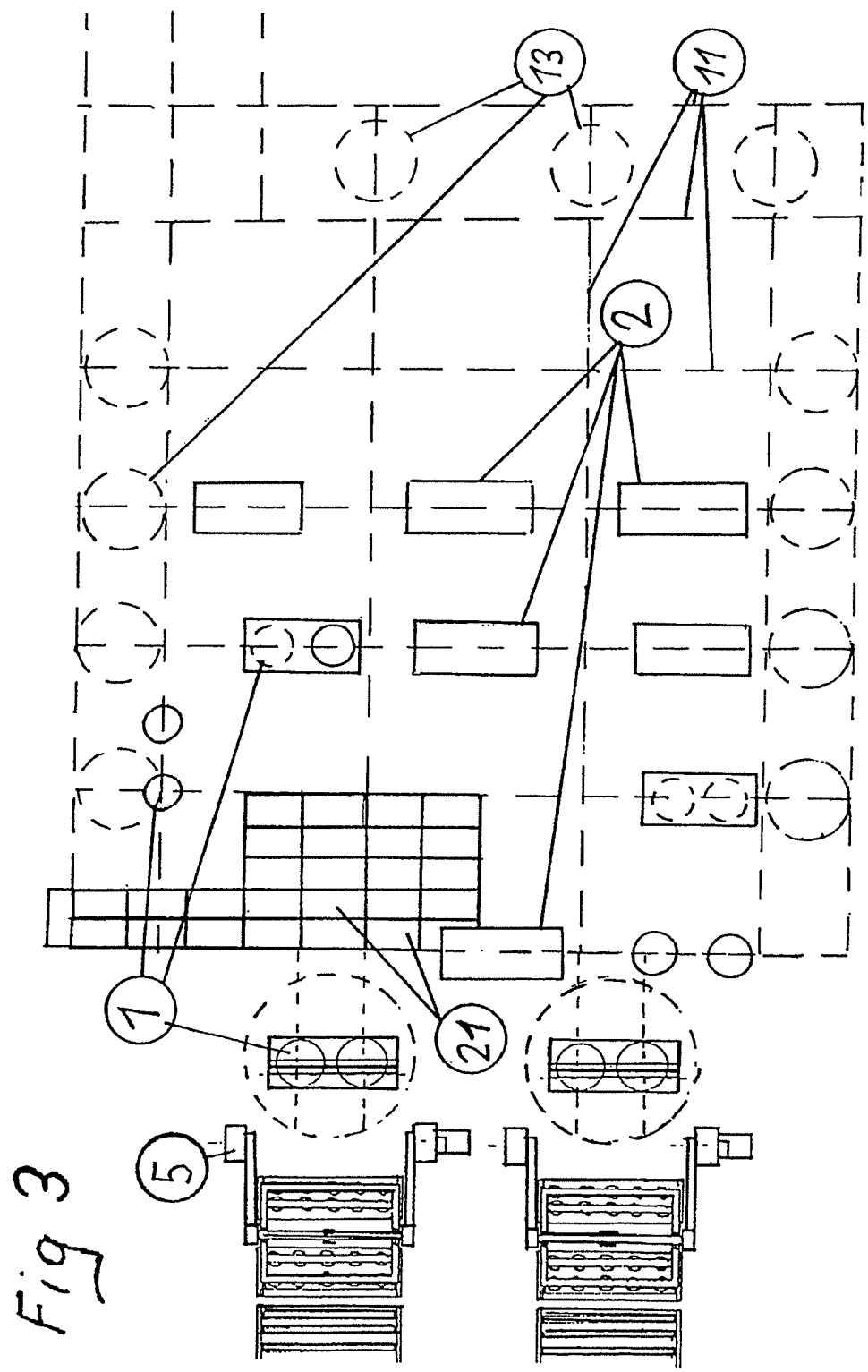
FIG. 3: shows a top view of an enlarged form of the apparatus according to the invention.

FIG. 3 shows a top view of an enlarged form of the apparatus according to the invention. It can be seen here that in place of simply one pivot-stack apparatus 5 two of them are provided as an example. Said two apparatuses 5, in this connection, can load onto corresponding stacking racks 1 either panels 4 which are produced from the same building material and/or for example are of a different thickness or panels 4 which are produced from different building materials. Such a variant would be conceivable, for example, in the case of the construction of a prefabricated house. A plurality of induction and control lines 11, the structure of which is shown here purely as an example, are necessary for the case shown. In this connection, however, a large range of variations of automatically drivable carriages 2 and turntables 13 is also produced. As an example for the installation of induction installation panels, as are cited in the description concerning FIG. 1, a corresponding part structure of corresponding panels 21 is marked here as an example. In this connection, the size and the dimensions of such induction installation panels 21 depend on the number of required lines 11, the number of points and the required line density of the inductively supplied areas.

The complex control of the described movement sequences requires a special control program.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

We claim:

1. An apparatus for the flush transfer of large-surface-area panels of different types of construction to a transporting vehicle, said apparatus having the following features:

a) at least one conveyor for delivering panels of at least one type of construction, wherein the conveyor has recesses for access to the panels even from the underside;
b) at least one pivot-stack apparatus with a gripper frame, a rotating and pivoting apparatus and with gripping elements which are fastened on the gripper frame;
c) at least one stacking rack on a drivable carriage, wherein said carriage is connected to at least one transporting vehicle by means of a connectable coupling, and wherein the transporting vehicle is supplied with power by means of a plurality of lines which are installed in the floor region and is controlled electronically or electrically, wherein a stacking rack of said at least one stacking rack comprises sensors on both stack sides for determining the number of panels located on each side; and
d) an electrically controlled parking brake on each transporting vehicle for locking.

2. The apparatus as claimed in claim 1, wherein a pivot-stack apparatus comprises a sensor and two pivot arms, wherein said sensor is on each of the two pivot arms for measuring the distance to the stacking rack.

3. The apparatus as claimed in claim 1, wherein a camera which is installed on the gripper frame records the dimensions and the relevant quality features of the incoming panels.

4. The apparatus as claimed in claim 1, wherein a panel correcting device serves for the purpose of correcting the alignment on the conveyor.

5. The apparatus as claimed in claim 1, wherein a stacking rack comprises a display with indication of the relevant parameters of the respective configuration.

6. A method for the flush transfer of large-surface-area panels of different types of construction to a transporting vehicle, said method having the following features:
a) every type of construction of panels used is transported on at least one conveyor into the region of at least one respective pivot-stack apparatus,
b) each panel is then lifted on the apparatus by means of gripping elements, which are fastened on a gripper frame, from the roller conveyor by means of a pivot arm and a rotating and pivoting device for the gripper frame and pivoted into the region of at least one stacking rack on a carriage, wherein the carriage is mechanically connected to at least two transporting vehicles by means of in each case one connectable coupling, and the transporting vehicles are driven and controlled in an inductive manner by means of induction and control lines,
c) at the same time the distance between the stacking rack and the apparatus is determined, the stacking rack is adjusted by means of both transporting vehicles and the carriage is mechanically locked,
d) the respective panel is then deposited on the relevant stacking rack by means of the pivot arm,
e) the relevant stacking rack, according to the desired loading on the relevant side, is then either rotated and loaded again on the other side or moved to a further destination.

7. The method as claimed in claim 6, wherein the dimensions and the relevant quantity features of the incoming panels are measured by means of a camera.

8. The method as claimed in claim 6, wherein the structure of the induction and control lines is produced by means of induction and installation panels.

* * * * *